United States Patent [19]

Stanesic

[11] Patent Number: 5,320,461
[45] Date of Patent: Jun. 14, 1994

[54] FASTENER FOR AIR CURRENT DEFLECTOR SHIELDS

[75] Inventor: John M. Stanesic, Johnston, Iowa

[73] Assignee: DFM-Corporation, Urbandale, Iowa

[21] Appl. No.: 969,983

[22] Filed: Nov. 2, 1992

[51] Int. Cl.⁵ .................................. F16B 39/00
[52] U.S. Cl. ........................ 411/258; 24/289; 24/304; 24/669
[58] Field of Search ............... 411/340, 258; 24/289, 24/297, 304, DIG. 11, 464, 470, 472, 702, 716, 473, 474, 669

[56] References Cited

U.S. PATENT DOCUMENTS

| | | | |
|---|---|---|---|
| 3,022,848 | 9/1959 | Heiser | 180/69 |
| 3,516,631 | 6/1970 | Santucci | 24/DIG. 11 X |
| 3,542,321 | 11/1970 | Kahabka | 24/DIG. 11 X |
| 3,606,433 | 9/1971 | Kunevicius | 24/297 X |
| 3,677,250 | 7/1972 | Thomas | 24/304 X |
| 4,052,099 | 10/1977 | Lowery | 296/91 |
| 4,250,596 | 2/1981 | Hara et al. | 24/289 |
| 4,488,206 | 12/1984 | Mizusawa | 24/297 |
| 4,576,664 | 3/1986 | Delahunty | 24/304 X |
| 4,621,860 | 11/1986 | Gerst | 296/91 |
| 4,627,657 | 12/1986 | Daniels | 296/91 |
| 4,750,697 | 6/1988 | Tontarelli | 24/669 X |
| 4,797,983 | 1/1989 | Barnett et al. | 24/297 X |
| 4,952,006 | 8/1990 | Willey | 296/91 |
| 5,082,321 | 1/1992 | Brewer | 296/91 |

FOREIGN PATENT DOCUMENTS 3803136  2/1989  Fed. Rep. of Germany .

*Primary Examiner*—Rodney M. Lindsey
*Attorney, Agent, or Firm*—Zarley, McKee, Thomte, Voorhees & Sease

[57] ABSTRACT

A fastener device is provided for mounting an air current deflector shield to the stiffener panel of the hood of a vehicle without making any holes in the hood. The device includes a substantially flat base member with a post extending downwardly therefrom. Double-stick adhesive tape adheres the base member to the hood. The posts are adapted to extend through corresponding apertures in the shield, and a securement clip engages the post so as to sandwich the shield between the base member and clip of the fastener device and prevent removal of the shield from the post. The clip can be removed from the post using the tip of a tool, such as a screwdriver.

17 Claims, 1 Drawing Sheet

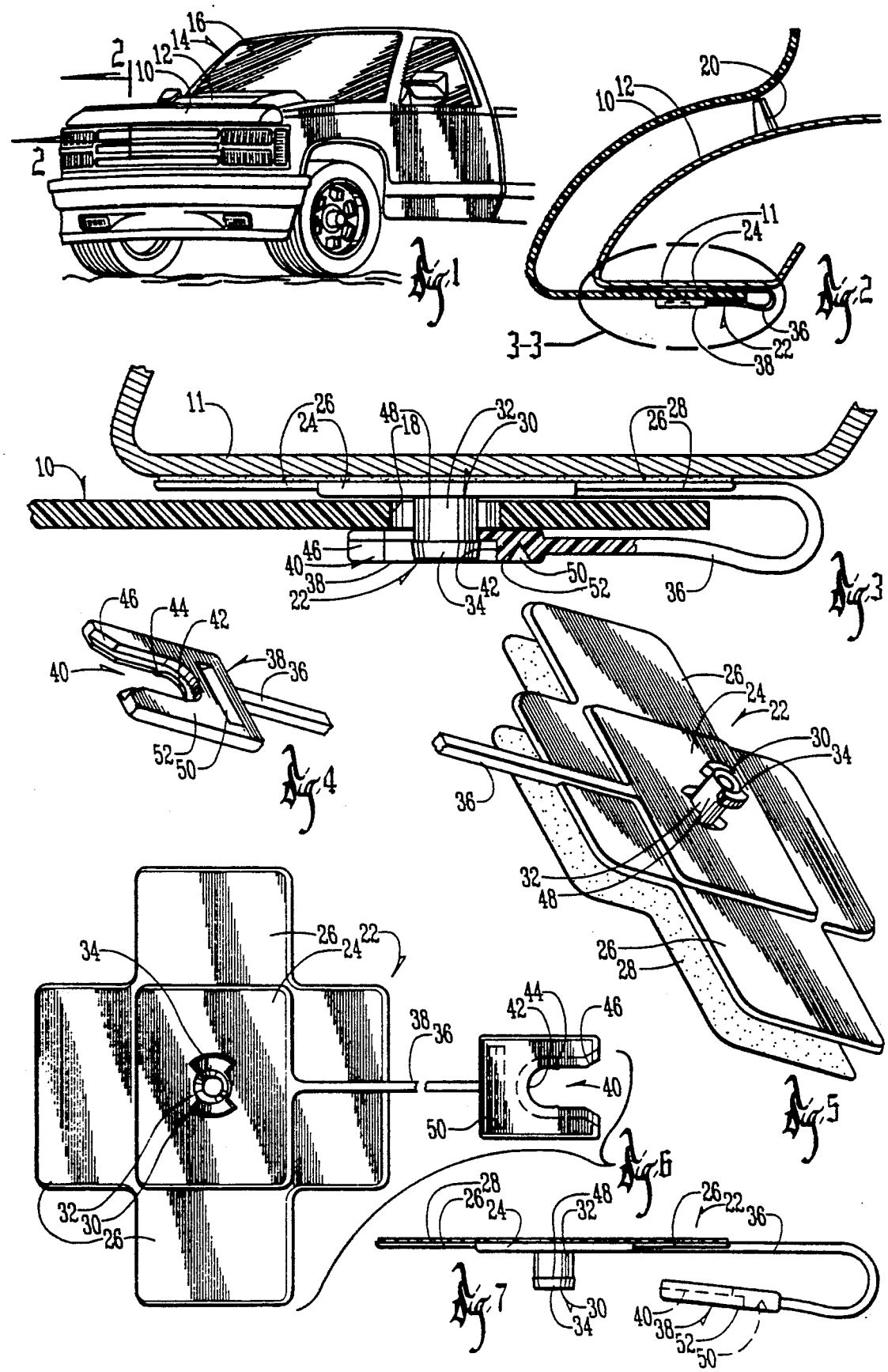

FASTENER FOR AIR CURRENT DEFLECTOR SHIELDS

BACKGROUND OF THE INVENTION

Air current deflector shields have been used for many years on motor vehicles, such as cars and trucks, so as to deflect air upwardly over the windshield of the vehicle. Such air deflection helps to keep the windshield clean, by carrying insects, rain and snow over the windshield. The deflector shields also deflect rocks and the like over the windshield so as to prevent cracks and chips in the windshield. In the past, deflector shields have been mounted to the hood of the vehicle using screws or bolts. U.S. patent application Ser. No. 756,818 filed on Sep. 9, 1991 discloses a quick release mechanism for mounting a shield to the hood of a vehicle. All of these prior art means for mounting the shield to the hood require a plurality of holes to be drilled in the hood, which is time consuming and requires proper tools. Accuracy in locating and drilling the holes is also critical to properly position the shield and to avoid unnecessary intrusion on the integrity of the hood.

Accordingly, a primary objective of the present invention is the provision of an improved fastener for securing an air current deflector shield to the hood of a vehicle.

A further objective of the present invention is the provision of a fastener device for mounting a deflector shield to the hood of a vehicle without making holes in the hood.

Another objective of the present invention is the provision of a fastener device for a deflector shield which allows the shield to be quickly, easily and securely mounted to the hood of the vehicle.

Another objective of the present invention is the provision of a deflector shield fastening device which is mounted upon the hood with adhesive.

Still a further objective of the present invention is the provision of an improved fastener for an air current deflector shield which allow the shield to be removed from the hood of the vehicle.

Another objective of the present invention is the provision of a fastener device for a deflector shield which is economical to manufacture and durable in use.

These and other objectives will become apparent from the following description of the invention.

SUMMARY OF THE INVENTION

A plurality of fastener devices are provided for mounting an air current deflector shield to the stiffener panel on the underside of the hood of a vehicle without making holes in the stiffener panel or hood. Each device includes a substantially flat base member, and double-stick adhesive tape for adhering the base member to the stiffener panel of the hood. A post extends downwardly from the base member for extension through a corresponding aperture in the shield. The post terminates in an enlarged head. A securing clip having a U-shaped slot or mouth retentively engages the post such that the shield member resides between the base member and the clip. The clip has a dimension greater than the size of the aperture in the shield, such that the shield is retained on the post. A strap or pigtail connects the clip to the base member. A recess is provided on the clip for receiving the tip of a tool, such as a screwdriver, such that the clip, and thus the shield, can be moved from the post.

DESCRIPTION OF THE DRAWINGS

FIG. 1 is a perspective view of an air current deflector shield mounted on the hood of a pickup truck.

FIG. 2 is a sectional view taken along lines 2—2 of FIG. 1.

FIG. 3 is an enlarged sectional view taken along lines 3—3 of FIG. 2 and showing the fastener device of the present invention.

FIG. 4 is a perspective view of the clip of the fastener device.

FIG. 5 is a perspective exploded view showing the base member of the fastener device.

FIG. 6 is a top plan view of the fastener device.

FIG. 7 is a side elevation view of the fastener device.

DESCRIPTION OF THE PREFERRED EMBODIMENT

With reference to the drawings, an air current deflector shield is generally designated by the reference numeral 10. The shield is mounted to the stiffener panel 11 on the underside of the hood 12 of a vehicle 14 so as to deflect air, insects, rocks, rain and snow upwardly over the windshield 16 of the vehicle. The shield 10 includes a plurality of apertures 18 for mounting the shield to the hood 12, as described below. The apertures 18 may be round holes or elongated slots which allow lateral adjustment of the shield relative to the hood 12, such that the shield can be centered upon the hood. A plurality of spacers 20 may be adhered to the hood of the vehicle so as to maintain the proper distance between the shield 10 and the hood 12, as seen in FIG. 2.

The above description of the deflector shield 10 is conventional and does not constitute a part of the present invention.

The present invention is directed towards a fastener device 22 for mounting the shield 10 upon the stiffener panel 11 of the hood 12. Normally, a plurality of fastener devices 22 are spaced along the panel 11 for securely mounting the shield to the hood.

The fastener device 22 includes a substantially flat base member 24 having flexible extension tabs 26 extending outwardly therefrom. The layer of double-stick tape 28 adheres the base member 24 and the extension tabs 26 to the stiffener panel 11. Tabs 26 are thin so as to be flexible, thereby allowing the tabs to conform to irregular surfaces. A post 30 extends downwardly from the base member 24. The post 30 includes a neck portion 32 with an enlarged head 34.

A strap or pigtail 36 extends from the base member 24 or one of the tabs 26 and terminates in a securing means 38. The securing means 38 is in the form of a clip having a U-shaped slot or mouth 40. The edge 42 of mouth 40 is adapted to frictionally engage the neck portion 32 of the post. A pair of opposing detents 42 are provided on the edge 40 such that the clip 38 will be retentively mounted on the post 30. The clips 38 includes a flange 46 extending along the edge 42 of the mouth 40. The flange 46 is adapted to engage the upper annular surface 48 of the head 34, as seen in FIG. 3. The clip 38 also has a V-shaped recess 50 therein which is adapted to receive the tip of a tool, such as a screwdriver, such that the clip can be pried off of the post 30.

Preferably, the base member 24, the extension tabs 26, the pigtail 36, and the clip 38 are integrally formed by injection molding from a flexible, resilient thermoplastic material, such as Ultramid manufactured by BASF.

In use, the fastener devices 22 are adhered to the stiffener panel 11 of the hood 12 with the tape 28, in a spaced relation corresponding to the spaced apertures 18 in the shield 10. Prior to application to the hood, the exposed side of the tape 28 may include a protective film (not shown) which can be easily peeled from the tape. Any portion of the extension tabs 26 which extend beyond the forward or rearward edges of the panel 11 may be trimmed off either before or after the fastener device 22 is adhered to the hood. After all of the fastening devices 22 are adhered to the stiffener panel 11, the shield 10 is positioned such that the apertures 18 can be slipped over the corresponding posts 30. The flexible pigtail 36 can be easily bent such that the clip 38 can be press fit onto the corresponding post of each fastener device. Thus, the shield 10 is sandwiched between the clip 38 and the base member 24, as best seen in FIG. 3. The dimension of the clip 38 is larger than the dimension of the aperture 18 in the shield, such that the shield is securely mounting on the hood 12. As seen in FIG. 3, when the shield is mounted over the post 30, the lower surface 52 of the clip 38 is substantially flush with the lower surface of the head 34 of the post. If it is desired to remove the shield from the hood, the flat tip of a tool, such as a screwdriver, can be inserted into the recess 50 to pry the clip 38 from the post 30, thereby allowing the shield to be removed from the post.

The invention has been shown and described above in connection with the preferred embodiment, and it is understood that many modifications, substitutions and additions may be made which are within the intended broad scope of the invention. For example, it is understood that the shape of the securing clip is not limited to the substantially rectangular shape shown in the drawings. The securing clip may also be in the form of a metallic spring clip extending around the post and beyond the aperture in the shield. A cotter pin or the like extending through the post can also be used as a securing means for retaining the shield on the post of each fastener device.

From the foregoing, it can be seen that the present invention accomplishes at least all of the stated objectives.

What is claimed is:

1. A fastener device for mounting an air current deflector shield to a hood of a vehicle without making holes in the hood, the device comprising:
    a substantially flat base member;
    adhesive means for adhering the base member to the hood without making holes in the hood;
    a post extending from the base member and being adapted to extend through an aperture in the shield;
    securement means releasably engageable with the post to prevent removal of the shield from the post.

2. The fastener device of claim 1 wherein the securement means includes a clip releasably secured at least partially around the post.

3. The fastener device of claim 2 wherein the post has an end with an enlarged head thereon to maintain the clip on the post.

4. The fastener device of claim 2 wherein the clip has detent means for securing the clip to the post.

5. The fastener device of claim 2 wherein the clip has a U-shaped slot therein for receiving the post.

6. The fastener device of claim 2 wherein the clip includes a recess for receiving a tip of a tool to remove the clip from the post.

7. The fastener device of claim 1 further comprising a pigtail flexibly connecting the securement means to the base member.

8. The fastener device of claim 1 wherein the securement means has a dimension greater than a dimension of the aperture in the shield such that the securement means will not pass through the aperture.

9. The fastener device of claim 1 wherein the adhesive means is a layer of double-stick adhesive tape.

10. The fastener device of claim 1 wherein the base member, post and securement means are integrally constructed.

11. The fastener device of claim 1 wherein the post has opposite sides, and the securement means spaced apart arms for positioning on opposite sides of the post.

12. A fastener device for mounting an air current deflector shield to a hood of a vehicle without making holes in the hood, comprising:
    a base member having a post extending downwardly therefrom, the post being extensible through an aperture in the shield;
    adhesive means for adhering the base member to the hood without making holes in the hood;
    clip means adapted to retentively and releasably engage the post and thereby sandwiching the shield between the clip means and the base member.

13. The fastener device of claim 12 further comprising strap means connecting the clip means to the base member.

14. The fastener device of claim 12 wherein the clip means is larger than the aperture in the shield such that the shield is held on the post by the clip means.

15. The fastener device of claim 12 wherein the clip means includes a mouth portion adapted to frictionally engage the post for retention thereon.

16. The fastener device of claim 12 wherein the clip means includes a recess for receiving a tip of a tool to remove the clip means from the post.

17. The fastener device of claim 12 wherein the post has opposite sides and the clip means extends on opposite sides of the post.

* * * * *